United States Patent [19]
Benecke et al.

[11] Patent Number: 5,430,339
[45] Date of Patent: Jul. 4, 1995

[54] ELECTRIC MOTOR

[75] Inventors: Wolfgang Benecke; Bernd Wagner; Jan Gimsa; Günter Fuhr; Rolf Hagedorn; Roland Glaser, all of Berlin, Germany

[73] Assignee: Fraunhofer Gesellschaft zur Foerderung der Forschung e.V., Munich, Germany

[21] Appl. No.: 915,858

[22] Filed: Sep. 21, 1992

[30] Foreign Application Priority Data

Feb. 2, 1990 [DE] Germany .................. 40 03 115.2

[51] Int. Cl.$^6$ ............................................. H02N 1/00
[52] U.S. Cl. .................................... 310/309; 310/114
[58] Field of Search .............. 310/40 MM, 308, 68 R, 310/309, 114; 318/116, 135

[56] References Cited

U.S. PATENT DOCUMENTS

| 3,024,371 | 3/1962 | Lefkowitz | 310/309 X |
| 3,729,925 | 5/1973 | Emerson | 318/116 |
| 4,740,410 | 4/1988 | Muller | 428/133 |

FOREIGN PATENT DOCUMENTS 0233947 9/1987 European Pat. Off. .
0136982 6/1988 Japan .

OTHER PUBLICATIONS

A Simple Liquid-Immersed Dielectric Motor; P. E. Secker et al; Journal of Applied Physics; vol. 39, May 1968; pp. 2957–2961.
Dielektrische Motoren, G. Fuhr et al., vol. 43, No. 2, 1989.
Laterally Driven Polysilicon Resonant Microstructures, W. C. Tang, et al., vol. 20, No. 1/2, Nov. 15, 1989.
Electric Motors On A Chip Advance From Academia's Labs, M. Leonard, vol. 38, No. 2, Jan. 25, 1990.
IC-Processed Electrostatic Micro-Motors, L. Sheng Fan, et al., Apr. 21, 1989.
Patent Abstracts of Japan, vol. 13, No. 348 Aug. 4, 1989 JPA 1 107667, Apr. 25, 1989.

Primary Examiner—R. Skudy
Attorney, Agent, or Firm—Evenson, McKeown, Edwards & Lenahan

[57] ABSTRACT

The present invention relates to a dielectric motor which is driven by means of electric fields. The motor is distinguished by two or more dielectric rotors being disposed in a central region which is surrounded by several electrodes.

The rotors may be made of different dielectric materials and be electrically axially asymmetric in design. They are driven by continuously or discontinuously rotating electric fields. Depending on the geometric and electric design, very variable rotation conditions can be achieved, which can be simply controlled via the frequency of the rotating fields. The motor is suited for switch and drive purposes and can be utilized to construct microdosing devices, pumps and valves.

22 Claims, 4 Drawing Sheets

ELECTRIC MOTOR

BACKGROUND AND SUMMARY OF THE INVENTION

The present invention relates to a dielectric motor which is driven by means of electric fields and which has rotors which are surrounded by several electrodes.

Engines of this type are suited for miniaturization and can be combined with microelectronic elements (system integration). They can be employed as drive means for miniaturized machines or pumps, as circuit elements or for position determination. For example, step by step operation can serve to clear or block optical channels for the transmission of data. The position can be determined by having the rotor only turn when the corresponding component takes up a specific position. Another field of application is use in micro-surgical instruments.

Descriptions of non-stop running motors driven by constant electric fields including their modus operandi and calculation of their rotational behavior can be found in Journals in the art (e.g. Secker, P. E.; Scialom, I. N.; A Simple Liquid Immersed Dielectric Motor, Journal of Applied Physics, 39, 1968, p. 2957 to 2961). The starting direction of rotation is not fixed in these motors so that additional auxiliary devices are required for starting.

The Japanese published patent JP-A-1 107 667 describes a motor in which two cylindrical rotors are excited to rotate about separate axes of rotation under the electrostatic influence of electrodes which are attached to the interior wall of a hollow cylinder.

Miniaturized dielectric motors of different design are described in GEO 10, 1988, page 188 and in the U.S. Pat. No. 4,740,410. In these motors rotating electric fields are utilized so that start devices are obviated. In the European patent EP-A-O 233 947 a dielectric motor is described, whose rotor is provided with radially disposed sector like dielectrics. In these described motors, excitation is based on an electrostatic effect. Alternating fields are also always arranged under quasi stationary conditions. For this reason the rotors of these motors always turn in the direction of the rotating field, consequently they are synchronous motors. The field of application of motors of this type is restricted by this characteristic.

With the publication "Dielektrische Motoren" in ELEKTRIE 43, 1989, 2, pages 45 to 50, a dielectric motor which has several fixed electrodes disposed around a central region has become state of the art. In the central region are two rotors made of dielectric material and disposed in a rotatable manner, which are driven by means of electric fields. Excitation occurs via a mutual field of excitation. The flexibility of the rotation conditions of this motor is limited due to the fact that the motion of the rotors is synchronous.

An object of the present invention is to provide a dielectric motor which has an influenceable rotational characteristic and which has a multiplicity of simple to adjust rotational conditions.

This and other objects are provided in a generic dielectric motor by rotors being made of different dielectric materials and having spatially separate axes of rotation.

Due to the disposition of the rotors in the same central electrode-bordered region, the rotors are driven via the same excitation field. The number and arrangement of the rotors in the central region result in various rotational conditions which can be utilized for suitable applications.

The rotors are made of different dielectric materials. By this means the various rotors are driven diversely by the same excitation field. The rotors may turn in the same or in opposite direction and have the same or different angular velocity.

In an alternative embodiment of the invented motor, at least one rotor is not axially symmetrical in design. This can be achieved by this rotor having regions made of different dielectric materials which are arranged in an axially asymmetrical manner relative to the axis of rotation. The rotor may, however, also have a geometric shape which is asymmetrical relative to the axis of rotation. Due to the axially asymmetrical design, the individual rotor already has various conditions of rotation. In combination with the additional rotors this further increases the number of total conditions of rotation.

According further to the present invention, at least one rotor has a fixed position in the central region of the motor. The position of the spatially not fixed rotors depends on the excitation field, the position of the other rotors, the surrounding medium and the position of the dielectric motor. Thus, conclusions can be drawn about, e.g., the position of the motor, by determining the rotational conditions. In this embodiment the rotors can be partially, constantly or never in mechanical contact with one another or with the electrodes.

The possible conditions can also be influenced according to another embodiment of the invention by conductive regions being built into the rotors or according to another embodiment of the invention by electrically polarizable elements being attached in the central region of the motor. These measures influence the rotational characteristic of the individual rotors. Thus the various rotors can be operated continuously, discontinuously or step by step at one and the same time.

An improvement of the present invention is provided in another embodiment of the invention. The rotors are designed as toothed drums. If two adjacent toothed drums are set in motion in opposite directions, the teeth of the drums accelerate a surrounding medium in a preferred direction. This improvement of the present invention is therefore suited as a pump for fluid or gaseous media. In this event it is advantageous according to another embodiment of the invention if at least one of the rotors is deformable. This embodiment prevents the closely adjacent rotors from being destroyed by a solid element in the pump medium.

According further to the present invention, the driving electric fields are strongly asynchronous to the rotational motion of the rotors. The rotor and field direction of rotation may be the same or opposite. The electric field may turn with up to $10^7$ greater velocity than the rotors.

The effects achieved with the present invention are intensified according to another embodiment of the invention by the electric field turning with an amplitude which changes per rotation. The rotation of the electric fields can be discontinuous according to another embodiment of the invention, by way of illustration, by applying phase-shifted square-wave voltages to the electrodes. In this manner, discontinuous rotation of one or all the rotors can be forced.

The invented motor can be especially strongly miniaturized. According further to the present invention, the motor is fabricated out of one substrate with the aid of micromechanical production methods. In this way, the motors can be produced with an expansion of less than 100 μm.

Used as a substrate is, by way of illustration, silicon, possibly provided with thin layers of insulation such as $SiO_2$, $Si_3N_4$, or glass. The electrodes are structured by employing photolithographic methods and galvanically molded, e.g. with gold. In this manner the electrode pattern can be defined with micrometer precision. By employing deep etch lithography, electrode heights of several 100 micrometers can be obtained.

The rotors are made of dielectric materials also using micromechanical processes. Rotors of heights in the micrometer range are fabricated out of the applied layers. Higher rotors can be made out of photographic lacquer using deep etch lithography.

Exact grooves and channels for fixing the rotor or conducting the surrounding solution of the motor in or out are etched into the substrate with isotropic or anisotropic and selective etching processes. A rotor axis connected to the substrate can also be fabricated with the same process. An encapsulation of the system can be achieved by means of a second wafer bonded onto the substrate wafer. The use of silicon as the substrate material makes it possible to integrate electric circuits for triggering and controlling the motor with the mechanical elements on the same substrate.

The advantages of the present invention are that many rotational conditions can be presented which can be utilized for various purposes. The motor can serve as a switch element or a variable drive. Microdosing devices, pumps and valves can be designed which can be utilized in technology, pharmacology, chemistry and biotechnology. As a result of the high degree of miniaturization, the starting time of the motor lies in the microsecond range.

DETAILED DESCRIPTION OF THE DRAWINGS

Figure 1A:
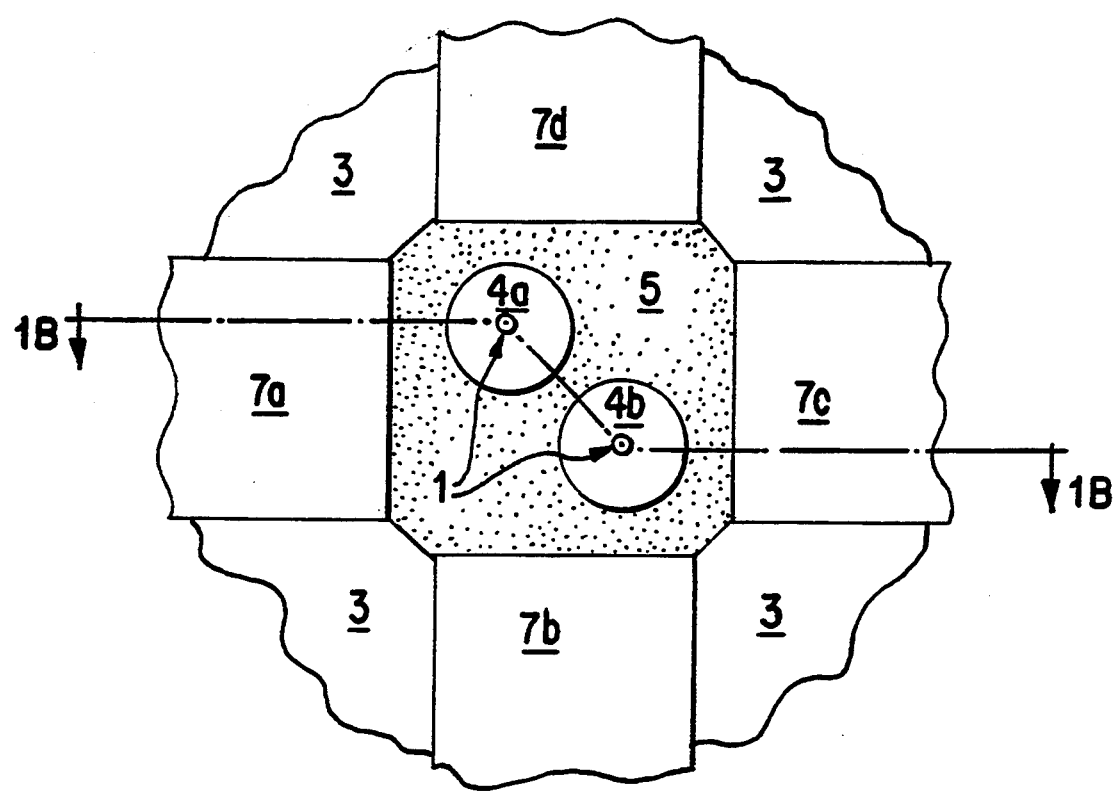
FIG. 1 is a top view and a side view of a dielectric motor having four electrodes and two dielectric rotors, constructed in accordance with an embodiment of the present invention.
Figure 1B:
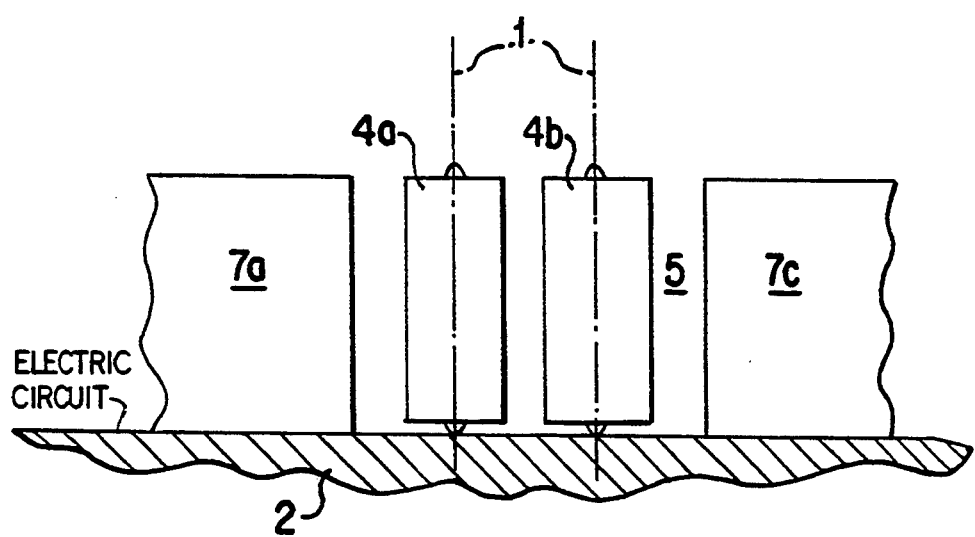

FIG. 1 shows a dielectric motor which is driven by means of electric fields. Four electrodes 7a to 7d are placed around a central region. Rotors 4a, 4b are disposed in a rotatable manner in the central region. The axes of rotation 1 are spatially separate. The bearing of the rotors 4 occurs in a state of the art manner on a substrate 2. The rotors 4 in the central region are surrounded by a weakly conductive surrounding medium 5, e.g. water or alcohol. The surrounding medium 5 may also be a gas. The electrodes 7a to 7c are insulated from one another by insulation regions 3.

If 90° phase-shifted sinus voltages are applied to the electrodes 7a to 7d respectively or an electrode to electrode Jumping electric vector field, the rotors 4a and 4b will rotate dependent on the angular velocity of the field and its amplitude. The smaller the distance between the rotors, the more pronounced is the occurrence of the collective rotational conditions. If dielectrically asymmetrical rotors or rotors which deviate from an axially symmetrical or spherical respectively cylindrical shape, or if only one rotor is designed in this manner, a continuous or discontinuous rotation of one rotor or both rotors, depending on the mode of triggering the electrodes 7, can be forced.

Figure 2:
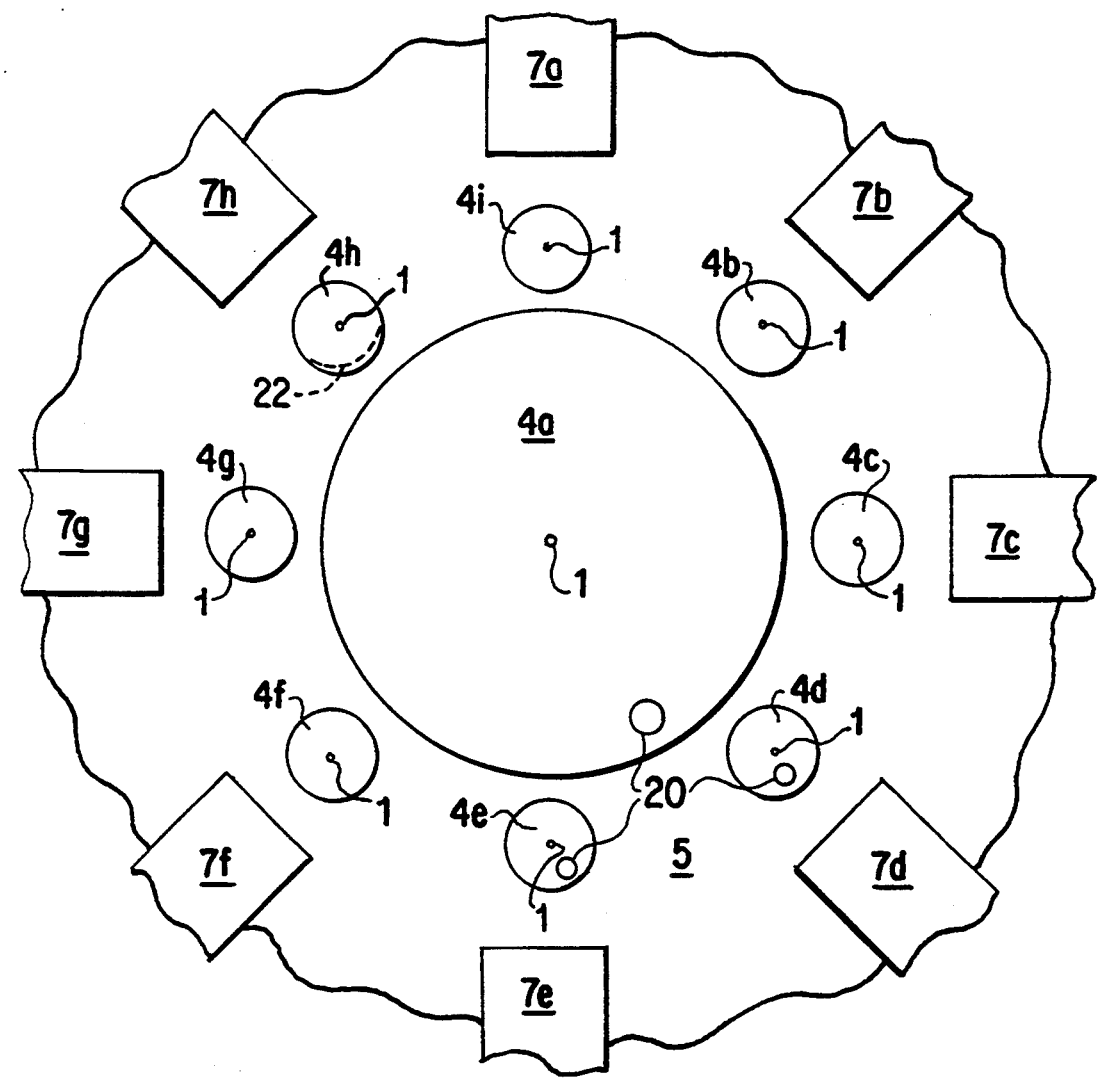
FIG. 2 is a top view of a dielectric motor having one large and eight small rotors constructed in accordance with an embodiment of the present invention.

The motor in FIG. 2 is composed of eight electrodes 7a to 7h, a large dielectric rotor 4a, which is disposed in the center, and eight small dielectric rotors 4b to 4i, which are disposed between the electrodes 7a to 7h and the large rotor 4a. The rotors 4 are immersed in a surrounding medium 5 (water, alcohol or a mixture of the two). The rotors 4 are disposed in a fixed position and can rotate about an axis of rotation 1. Also, shown in FIG. 2, conductive regions 20 can be built into the rotors. Further, at least one of the rotors can be deformable as shown by dotted lines 22 with respect to rotor 4h. The bearing and the principle design of the motor is the same as in the embodiment of FIG. 1. The rotors 4 form an ensemble and the collective mutual electric influencing characterizes the rotation of the individual rotors. Due to its size, rotor 4a is dominant. The selection of rotor dielectrics and design (dielectrically uniform, sector like, shell-shaped or built up in layers in the direction of the axis of rotation 1) permits altering the rotational behavior of the individual rotors and influencing the behavior of the rotor ensemble. The rotors can also counter rotate in the same field of motion. A multiplicity of rotational conditions which can be utilized for switching or triggering purposes, by way of illustration, for miniaturized sensors can be produced with the aid of these different rotations or group wise same rotations. Continuous rotation is generated by a continuously rotating electric field (8 times 45° phase-shifted sinus voltage). The more rotors that are placed into the electrode space, the more pronounced is the collective effect of the rotor ensemble.

Figure 3:
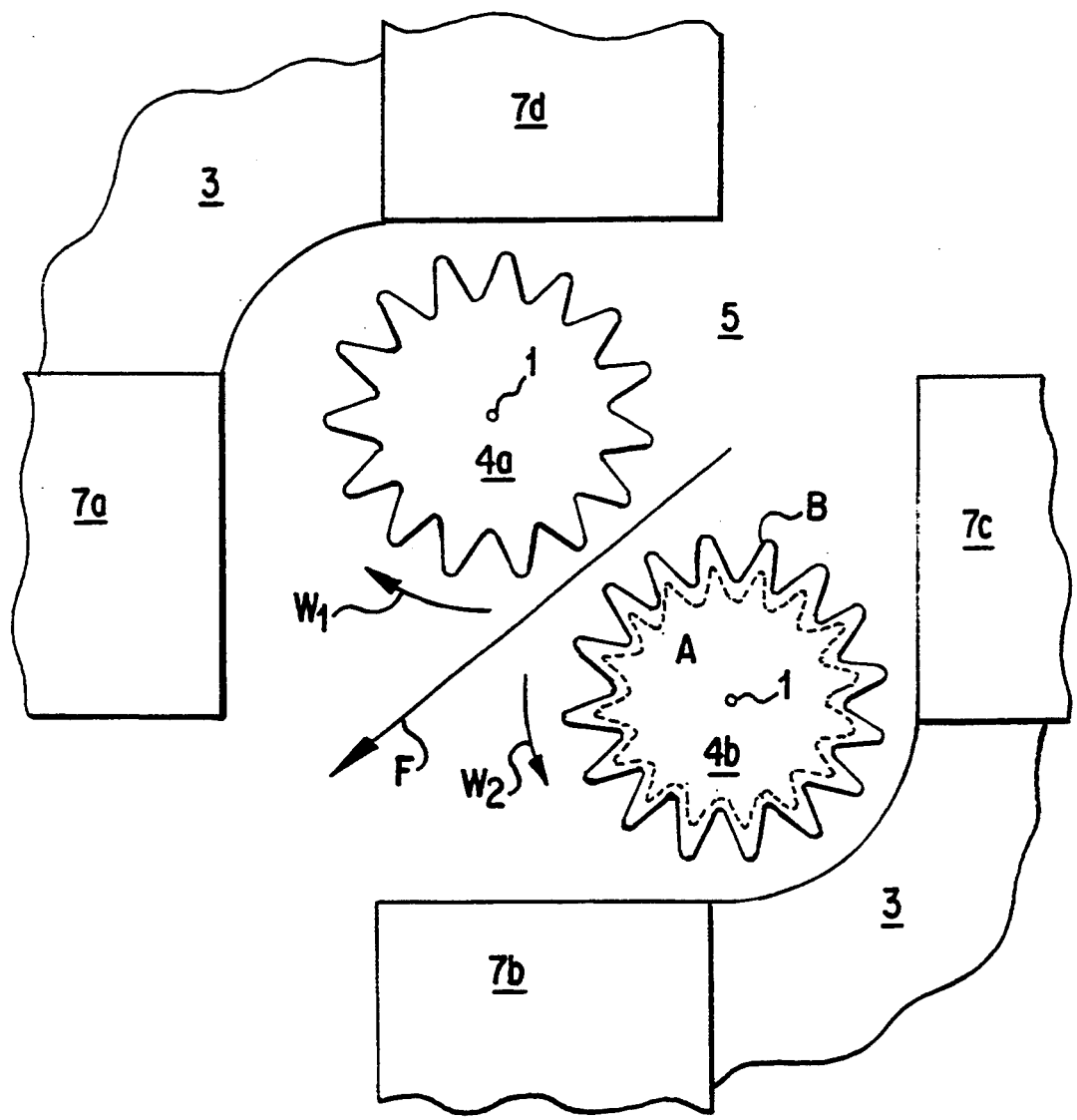
FIG. 3 is a top view of a dielectric motor having two rotors constructed in accordance with an embodiment of the present invention.

The motor in FIG. 3 comprises four electrodes 7a to 7d and two dielectric rotors 4a, 4b which can rotate in a fixed position around axis 1, with one of the rotors 4b being made of an internal dielectrics a and a shell b. Both rotors are designed dielectrically in such a manner that they execute a counter rotation when a specific angular velocity of the external rotational field which is generated via the electrodes 7 is applied. The counter rotation is indicated by the curved arrows and the respective angular velocities w1 and w2. The surrounding solution 5 (a liquid or a gas) is accelerated by the counter rotation in a preferred direction. As indicated by the arrow F, transport occurs from the side with the electrodes 7c, 7d to the side with the electrodes 7a, 7b if the other sides of the rotor space is sealed by the electrically insulating regions 3. By switching the rotational direction of the field or altering the angular velocity of the field, the pump direction can be reversed. With the aid of this arrangement, extremely small microdosing devices and pumps or valves can be constructed.

Figure 4:
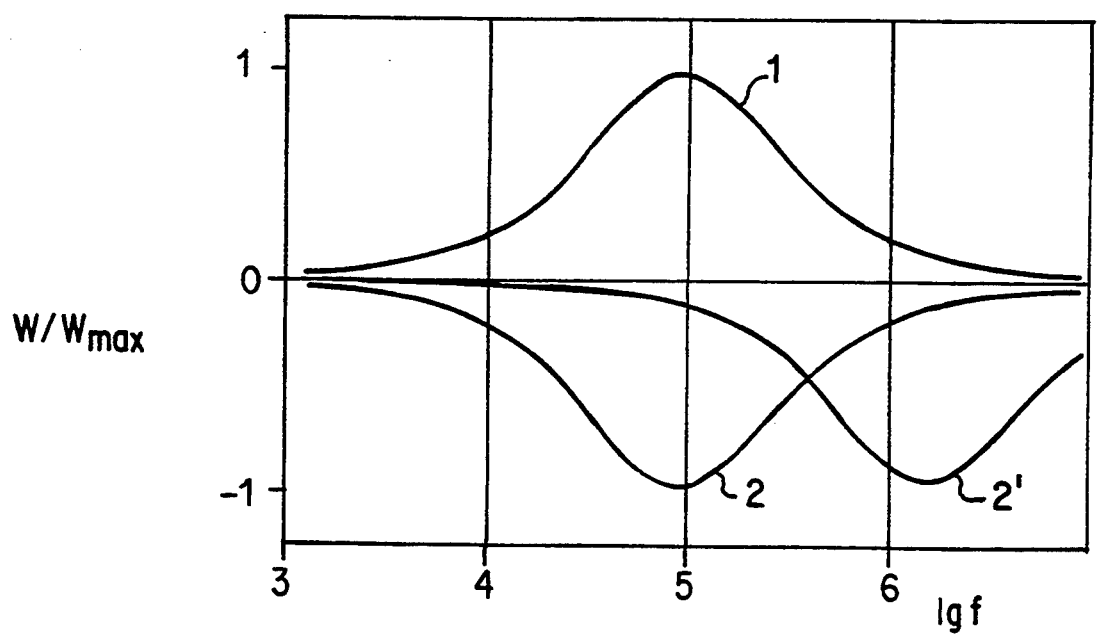
FIG. 4 shows the dependence of the angular velocity of two rotors on the frequency of the exciting electric field of rotation.

FIG. 4 depicts the angular velocities of both rotors shown in FIG. 3 dependent on the frequency of the rotating electric field. In vertical direction the angular velocity is plotted normed to the maximum angular velocity, in horizontal direction the frequency of the exciting field is plotted in logarithmic scale. Curve 1 relates to rotor 4a, curve 2 to rotor 4b. At a frequency of approximately 105 Hz, the rotors reach the greatest counter rotation angular velocities. Pump performance of the motor operated as a pump is greatest at this frequency.

The selection of the dielectrics of the rotors and the conductivity of the surrounding solution permits varying the position of the maximum angular velocity relative to the field frequency when the rotational direction of the field is fixed, which is indicated by the shifted curve 2'. In addition to the electric field, pump performance is also influenced by the passive electric properties of the rotors and the pump liquid. Furthermore, the rotors influence each other mutually via their induced dipole field. They are not only hydromechanically electrically coupled, but also without contact, resulting in complex system behavior which can be adapted to the respective application.

According to the invention, certain embodiments can have a dielectric motor wherein: at least one of the rotors is axially asymmetric with respect to an axis of rotation of the rotor; at least one of the rotors contains conductive regions; electrically polarizable elements are placed in the central region; at least one of the rotors is deformable; the rotation of a driving electric field is strongly asynchronous to the rotation of the rotors; the amplitude of electric fields provided for driving the rotors changes per field rotation; and wherein the mechanical elements, having an electric circuit for triggering and controlling the motor, are integrated on the same substrate.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A dielectric motor, arranged on a substrate, which is driven by means of electric fields and which has several fixed electrodes which are placed around a central region, with at least two rotors made of dielectric material, being in a rotatable manner in said central region, wherein said rotors are made of different dielectric materials and have spatially separate axes of rotation, and further wherein said rotors are toothed drums.

2. A dielectric motor according to claim 1, wherein at least one of said rotors is axially asymmetric with respect to an axis of rotation of said rotor.

3. A dielectric motor according to claim 1, wherein said axis of rotation of at least one of said rotors is spatially fixed and an axis of rotation of another of said rotors is adapted to be moved in said central region.

4. A dielectric motor according to claim 1, wherein at least one of said rotors contains conductive regions.

5. A dielectric motor according to claim 1, wherein electrically polarizable elements are placed in said central region.

6. A dielectric motor according to claim 1, wherein at least one of said rotors is deformable.

7. A dielectric motor according to claim 1, wherein the rotation of a driving electric field is strongly asynchronous to the rotation of said rotors.

8. A dielectric motor according to claim 1, wherein amplitude of electric fields provided for driving said rotors changes per field rotation.

9. A dielectric motor according to claim 1, wherein rotors are driven by discontinuously rotating electric fields.

10. A dielectric motor according to claim 1, wherein $SiO_2$, $Si_3N_4$, $TiO_2$ or glass is employed as dielectrics.

11. A dielectric motor according to claim 1, wherein mechanical elements have an electric circuit for triggering and controlling said motor, said electric circuit being integrated on the substrate.

12. A dielectric motor according to claim 1, wherein a semiconductor mono-crystal is utilized as a substrate for said motor.

13. A dielectric motor according to claim 2, wherein said axis of rotation of at least one of said rotors is spatially fixed on an axis of rotation of another of said rotors is adapted to be moved in said central region.

14. A dielectric motor according to claim 13, wherein at least one of said rotors contains conductive regions.

15. A dielectric motor according to claim 14, wherein electrically polarizable elements are placed in said central region.

16. A dielectric motor according to claim 15, wherein at least one of said rotors is deformable.

17. A dielectric motor according to claim 16, wherein rotation of a driving electric field is strongly asynchronous to rotation of said rotors.

18. A dielectric motor according to claim 17, wherein amplitude of electric fields provided for driving said rotors changes per field rotation.

19. A dielectric motor according to claim 18, wherein rotors said are driven by discontinuously rotating electric fields.

20. A dielectric motor according to claim 19, wherein $SiO_2$, $Si_3N_4$, $TiO_2$ or glass is employed as dielectrics.

21. A dielectric motor according to claim 20, wherein mechanical elements have an electric circuit for triggering and controlling said motor, said electric circuit being integrated on the substrate.

22. A dielectric motor according to claim 21, wherein a semiconductor mono-crystal is utilized as a substrate for said motor.

* * * * *